United States Patent [19]

Oates et al.

[11] Patent Number: 4,959,433
[45] Date of Patent: Sep. 25, 1990

[54] PARTIALLY POLYMERIZED BIS(ALLYLIC CARBONATE) MONOMER HAVING HIGH ALLYLIC UTILIZATION

[75] Inventors: Stephanie J. Oates, Wadsworth; Edward J. Sare, Clinton, both of Ohio

[73] Assignee: PPG Industries, Inc., Pittsburgh, Pa.

[21] Appl. No.: 24,878

[22] Filed: Mar. 12, 1987

Related U.S. Application Data

[63] Continuation of Ser. No. 840,264, Mar. 17, 1986, abandoned.

[51] Int. Cl.$^5$ .............................................. C08F 18/24
[52] U.S. Cl. ...................................................... 526/314
[58] Field of Search ........................................ 526/314

[56] References Cited

U.S. PATENT DOCUMENTS

| | | | |
|---|---|---|---|
| 2,370,567 | 2/1945 | Muskat et al. | 526/314 |
| 2,379,218 | 6/1945 | Dial et al. | 18/58 |
| 2,385,933 | 10/1945 | Muskat et al. | 526/314 |
| 2,403,113 | 7/1946 | Muskat et al. | 526/314 |
| 2,407,446 | 9/1946 | Pollack | 526/314 |
| 2,464,056 | 3/1949 | Pechukas | 526/314 |
| 2,587,437 | 2/1952 | Bralley | 526/314 |
| 4,139,578 | 2/1979 | Baughman et al. | 526/314 |
| 4,346,197 | 8/1982 | Crano et al. | 525/277 |
| 4,398,008 | 8/1983 | Misura | 526/314 |
| 4,408,016 | 10/1983 | Eads et al. | 525/277 |
| 4,590,248 | 5/1986 | Moriya et al. | 526/314 |
| 4,622,376 | 11/1986 | Misura et al. | 526/286 |
| 4,666,976 | 5/1987 | Misura | 524/739 |

FOREIGN PATENT DOCUMENTS

| | | |
|---|---|---|
| 538729 | 3/1957 | Canada . |
| 0130838 | 1/1985 | European Pat. Off. . |
| 0144782 | 6/1985 | . |
| 51-9188 | 1/1976 | Japan ................................. 526/314 |
| 57-133106 | 8/1982 | Japan ................................. 526/314 |
| 58-167125 | 10/1983 | Japan . |

OTHER PUBLICATIONS

E. Schnarr et al., *Journal of Polymer Science, Polymer chemistry Edition*, vol. 18, (1980), pp. 913-922.
J. H. O'Donnell et al., *Polymer Bulletin* (1981), pp. 103-110.
L. S. Luskin, *Modern Plastics Encyclopedia 1984-1985*, pp. 196-197.
F. W. Billmeyer, Jr., *Textbook of Polymer Science*, 2nd Ed:, (1971), pp. 264-279, 364-367.
*Encyclopedia of Polymer Science and Technology*, vol. 1, (1964), pp. 750-759.
*Encyclopedia of Polymer Science and Engineering*, vol. 4, (1986), pp. 779-791, 806-811.
Isaoka et al., "Mobility of the Ring Structure and the Characteristics of Crosslinked Polymers", *Journal of Polymer Science*, Part A-1, vol. 8, pp. 3009-3018 (1970).

*Primary Examiner*—Christopher Henderson
*Attorney, Agent, or Firm*—George D. Morris

[57] ABSTRACT

Polymerizable, liquid, substantially gel-free, partially polymerized monomer compositions having allylic utilizations greater than 50 percent can be prepared if the monomer which has been partially polymerized is bis-(allylic carbonate) monomer of at least one 4,4'-(alkylidene)-bis[phenol], bis(allylic carbonate) monomer of at least one 4,4'-[phenylenebis(alkylidene)]bis [phenol], or a mixture thereof.

14 Claims, No Drawings

PARTIALLY POLYMERIZED BIS(ALLYLIC CARBONATE) MONOMER HAVING HIGH ALLYLIC UTILIZATION

This application is a continuation of application Ser. No. 840,264, filed Mar. 17, 1986, now abandoned.

BACKGROUND OF THE INVENTION

Bis(allylic carbonate) monomers are frequently free-radically polymerized to yield hard polymers. Many of these monomers yield rigid polymers which exhibit high transparency to visible light when undyed, substantial hardness, and refractive indices that are sufficient for many, if not most, ophthalmic applications. For these reasons, such monomers find utility as precursors for optical lenses (especially ophthalmic lenses), lens blanks, sunglass lenses, face shields, filters, flat or curved sheets, coatings, and other optical elements.

One problem associated with the polymerization of bis(allylic carbonate) monomers is the relatively high shrinkage of the material which occurs during the course of polymerization. For example, shrinkage during the homopolymerization of diethylene glycol bis(allyl carbonate) monomer is approximately 12.5 percent. Such large degrees of shrinkage are especially troublesome where polymerizable bis(allylic carbonate) monomer compositions are polymerized in substantially enclosed molds typical of many casting operations. Although it is not desired to bound by any theory, it is believed that much, if not most, of the shrinkage can be attributed to the conversion of allylic groups to polymer segments.

As used herein, the term "shrinkage" is equal to $(D_p - D_m)/D_p$ where $D_p$ is the density of the final thermoset polymerizate at 25° C. and $D_m$ is the density of the casting composition at 25° C. The term "percent shrinkage" is equal to shrinkage multiplied by one hundred.

One manner of reducing the degree of shrinkage during the casting operation has been to form a liquid prepolymer from bis(allylic carbonate) monomer, charge the mold with the prepolymer (and added initiator, when necessary), and polymerize the prepolymer to form a hard polymerizate. Inasmuch as a portion of the allylic groups have been converted prior to charging the mold, the shrinkage occurring during polymerization in the mold is reduced. The prepolymerization technique has therefore provided some success in dealing with the shrinkage problem.

The major obstacle to further reductions of shrinkage via the prepolymerization route has been gellation. Early prepolymerization techniques generally resulted in gellation when only a small proportion of the total available allyl groups had been utilized. For example, in forming prepolymers from diethylene glycol bis(allyl carbonate) monomer, gellation was typically observed after about 12 percent of the allylic groups had been utilized. Further work led to further improvements and prepolymers of diethylene glycol bis(allyl carbonate) having allylic utilizations of up to about 17 percent could be achieved prior to gellation; see, for example, Japanese Kokai Patent No. Sho 51[1976]-9188.

A major advance in the art of forming poly(alkylic carbonate)functional prepolymers has been described in detail in Application Serial No. 549,850, filed Nov. 9, 1983, now abandoned, and in copending Application Ser. No. 690,411, filed Jan. 10, 1985, now abandoned, the entire disclosures of which are incorporated herein by reference.

In accordance with a method of Application Ser. No. 549,850 and Application Ser. No. 690,411 poly(allylic carbonate)-functional monomer is dissolved in a solvent in which the polymer produced from such monomer is also soluble. Preferably, the initiator used to conduct the polymerization is also soluble in the solvent. The resulting liquid solution comprising poly(allylic carbonate)-functional monomer, solvent, and preferably initiator is then partially polymerized by heating the liquid solution to polymerization temperatures. The polymerization reaction is allowed to continue until more than 12 percent allylic utilization is attained. The degree of allylic utilization can be controlled by regulating the amount of initiator added to the liquid solution, the temperature at which the partial polymerization is performed, and the ratio of solvent to poly(allylic carbonate)-functional monomer. Generally, the greater the amount of initiator used, the higher is the allylic utilization. The higher the temperature of polymerization, the lower is the degree of allylic utilization. At constant temperature and employing a given amount of initiator, the higher the ratio of solvent to monomer, the lower is the degree of allylic utilization. Ordinarily however, if at constant temperature the ratio of solvent to monomer is increased and the amount of initiator employed is also sufficiently increased, the reaction can be driven to a higher degree of allylic utilization without the formation of gel than in a system containing less solvent.

In a preferred embodiment of Application Ser. No. 549,850 and Application Serial No. 690,411, from about 0.1 to about 1.5 weight percent of initiator, basis the amount of monomer, from about 0.5 to 5 milliliters of solvent per gram of monomer, and polymerization temperatures of from 28° C. to about 100° C. are used. The degree of allylic utilization can be monitored by nuclear magnetic resonance (NMR) and infrared (IR) spectroscopy. The solvent in the resulting composition can be removed by known techniques, e.g., by evaporation or distillation, leaving a viscous liquid comprising a solution of poly(allylic carbonate)-functional prepolymer in poly(allylic carbonate)-functional monomer. This solution is typically a syrupy liquid having a kinematic viscosity (measured with a capillary viscometer) of from at least about 100 centistokes to about 100,000 centistokes, typically from about 1000 to 40,000 centistokes, more typically from about 500 to 2,000 centistokes, measured at 25° C., and a bulk density at 25° C. of from about 1.17 to about 1.23 grams per cubic centimeter. The solution is further characterized by having more than 12 percent allylic utilization, preferably from at least 15 to 50 percent allylic utilization, and, in a particularly preferred exemplification, from about 20 to 50 percent allylic utilization, as determined by infrared spectroscopy or nuclear magnetic resonance spectroscopy.

Application Ser. No. 549,850 and Application Ser. No. 690,411 indicate that the process therein described is applicable to poly(allylic carbonate)-functional monomers having an (allylic carbonate) functionality of from 2 to 5, preferably 2. Both aliphatic diol bis(allylic carbonate) monomers and bisphenol bis(allylic carbonate) monomers are discussed.

The most salient point in respect of Application Ser. No. 549,850 and Application Ser. No. 690,411 is that techniques are taught which permit the formation of poly(allylic carbonate)-functional prepolymers having up to 50 percent allylic utilization without gellation. This represents a major advance in the poly(allylic carbonate)-functional Prepolymer art.

The Invention

Contrary to what the prior art shows with respect to allylic utilization, it has now been discovered that substantially gel-free prepolymer having an allylic utilization of more than 50 percent may be achieved by paying particular attention to the types of bis(allylic carbonate) monomers used in its preparation. The substantial lack of gellation is indeed unexpected when it is considered that more than half of the allylic groups in an essentially bis(allylic carbonate)-functional system have been reacted.

Accordingly, one embodiment of the invention is a polymerizable, liquid, substantially gel-free, partially polymerized monomer composition wherein (a) the monomer which has been partially polymerized is bis-(allylic carbonate) monomer of at least one 4,4'-(alkylidene) bis-[phenol], bis(allylic carbonate) monomer of at least one 4,4'-[phenylenebis(alkylidene)]bis[phenol], or a mixture thereof, and (b) the allylic utilization of the composition is greater than 50 percent.

Often the allylic utilization is at least 51 percent. In many cases, the allylic utilization is at least about 55 percent, and preferably it is at least about 60 percent. Frequently the allylic utilization is in the range of from 51 to about 80 percent. Allylic utilizations in the range of from about 55 to about 80 percent, especially from about 60 to about 80 percent, are preferred.

The bis(allylic carbonate) monomer of at least one 4,4'-(alkylidene)bis[phenol] and/or at least one 4,4'-[phenylene bis(alkylidene)]bis-[phenol] which is partially polymerized may be unsubstituted, substituted with one or more minor substituents, or some may be unsubstituted and some may be substituted. When more than one substituent is employed, they may be the same or different, or some may be the same while being different from one or more others. Examples of substituents which may be employed include halo, lower alkyl, and lower alkoxy. Halo is most commonly fluoro, chloro or bromo; chloro and bromo are the preferred halo groups. The lower alkyl generally contains from 1 to about 4 carbon atoms; methyl and ethyl are the preferred lower alkyl groups. Methoxy and ethoxy are the preferred alkoxy groups.

The numbers, identities, and locations of the substituents, when used, should be such as not to preclude formation of the prepolymer composition of the invention.

Each alkylidene group independently contains at least one carbon atom and may be branched or unbranched. In many cases each alkylidene independently contains from 1 to about 5 carbon atoms. Examples of suitable alkylidene groups include methylene, ethylidene, propylidene, 1-methylethylidene (viz., isopropylidene), butylidene, 1-methylpropylidene, 2-methylpropylidene, and 2-ethylpropylidene. 1-Methylethylidene is preferred.

The central phenylene group of the bis(allylic carbonate) monomer of 4,4'-[phenylenebis(alkylidene)]bis[phenol] may be 1,2-phenylene, 1,3-phenylene, or 1,4-phenylene. The preferred phenylene group is 1,3-phenylene.

The monomers themselves are either well known or can be prepared by procedures well known in the art. See, for example, U.S. Pat. No. 2,370,567; 2,455,652; 2,455,653; and 2,587,437, the disclosures of which are, in their entireties, incorporated herein by reference. In one method, the appropriate allylic alcohol is reacted with phosgene to form the corresponding allylic chloroformate which is then reacted with the desired 4,4'-(alkylidene)bis[phenol] and/or 4,4'-[phenylenebis(alkylidene)]bis[phenol]. In a second method the 4,4'-(alkylidene)bis[phenol] and/or 4,4'-[phenylenebis(alkylidene)]bis-[phenol] is reacted with phosgene to form bischloroformate which is then reacted with the appropriate allylic alcohol. In a third method, the 4,4'-(alkylidene)bis[phenol] and/or 4,4'-[phenylenebis(alkylidene)]bis-[phenol], the appropriate allylic alcohol, and phosgene are mixed together and reacted. In all these reactions the proportions of reactants are approximately stoichiometric, except that phosgene may be used in substantial excess if desired, and in the second method, an excess of the allylic alcohol may be employed. The temperatures of the chloroformate-forming reactions are preferably below about 100° C. in order to minimize the formation of undesirable by-products. Ordinarily the temperature of the chloroformate-forming reaction is in the range of from about 0° C. to about 20° C. The carbonate-forming reaction is usually conducted at about the same temperatures, although higher temperatures may be employed. Suitable acid acceptors, e.g., pyridine, tertiary amine, alkali metal hydroxide, or alkaline earth metal hydroxide may be employed when desired. The reactions are usually liquid phase reactions. Preferably they are conducted in the absence of extrinsic solvent, although extrinsic solvent may be used when desirable or when necessary to solubilize one or more of the reactants. Examples of suitable extrinsic solvents that may be used include benzene, toluene, xylene, chlorobenzene, o-dichlorobenzene, o-chlorotoluene, acetone, methylene chloride, chloroform, perchloroethylene, trichloroethylene, and carbon tetrachloride. The pressures at which the reactions are conducted may vary widely, but usually they are at about ambient pressure or a little higher depending upon the pressure drop through the equipment.

It will be recognized that one bisphenolic compound described above or a mixture of such bisphenolic compounds may be used in forming the bis(allylic carbonate) monomer. When a mixture is employed, each may be a member of the class 4,4'-(alkylidene)bis[phenol], each may be a member of the class 4,4'-[phenylenebis-(alkylidene)bis[phenol], or one or more may be from one class and one or more from the other class.

The bisphenolic compounds which can be used in preparing the bis(allylic carbonate) monomer may each be represented by the formula

where A is represented by the formula

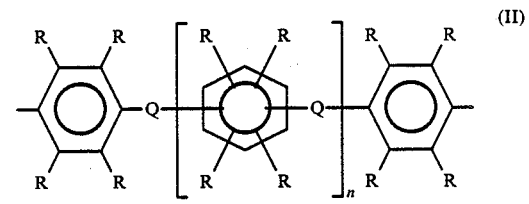

in which each Q is alkylidene as discussed above, each R of the compound is independently hydrogen or a minor substituent as discussed above, and the value of n is 0 or 1.

When the value of n is 1, it is preferred that A be represented by the formula

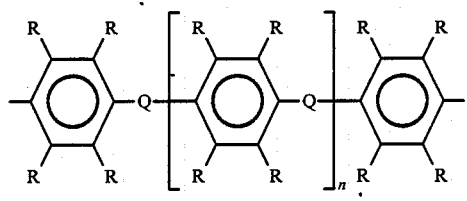 (III)

or by the formula

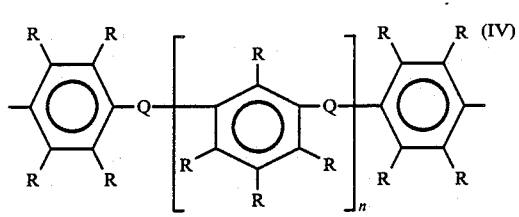 (IV)

where Q, R, and n are as discussed in respect of Formula II.

It is preferred that the value of n be 0, in which case A is represented by the formula

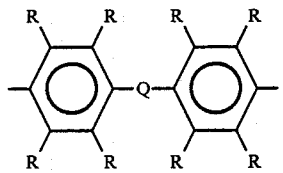 (V)

where Q and R are as discussed in respect of Formula II.

Examples of bisphenolic compounds which can be used include 4,4'-(methylene)bis[phenol]
4,4'-(1-methylethylidene)bis[phenol]
4,4'-(1-methylethylidene)bis[2,6-dichlorophenol]
4,4'-(1-methylethylidene)bis[2,6-dibromophenol]
4,4'-(1-methylpropylidene)bis[phenol]
4,4'-[1,4-phenylenebis(1-methylethylidene)]bis[phenol]
4,4'-[1,3-phenylenebis(1-methylethylidene)]bis[phenol]

The monomeric compositions prepared by the processes described above chiefly comprise one or more bis(allylic carbonate)-functional monomeric compounds represented by the formula

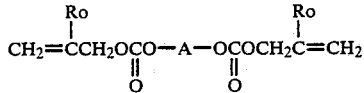 (VI)

in which A is as discussed above in respect of Formula I and each Ro is independently hydrogen or methyl. In most cases both of the Ro groups are the same; preferably both are hydrogen.

Because of the nature of the processes by which the monomeric compositions are prepared, the monomeric compositions can contain minor amounts of related species. In the case of monomeric compounds represented by Formula VI, individual related species can be represented by the formula

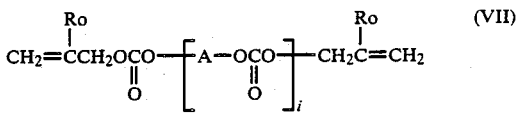 (VII)

or the formula

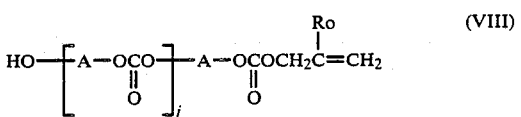 (VIII)

or the formula

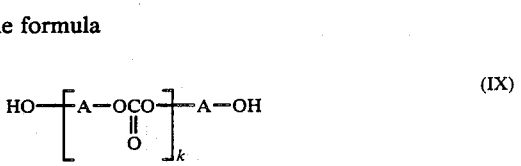 (IX)

wherein each R is as discussed above with respect to Formula VI, each A is independently as discussed with respect to Formula I, i is a whole number from 2 to about 5, j is a whole number from 0 to about 5, and k is a whole number from 0 to about 5.

The reaction mixture may be purified so as to contain essentially no related species, but this is rarely done. Although the reaction mixture may contain only a single related species, it usually contains a mixture of different related species. Typically all of the related species taken together constitute from about 0.5 to about 3 weight percent of the reaction mixture on an extrinsic solvent-free basis.

Similarly, one compound represented by Formula VI or a group of such compounds may be isolated from the reaction mixture, but this also is rarely done.

As used in the present specification and claims, the terms bis-(allylic carbonate) monomer of 4,4'-(alkylidene)bis[phenol], bis(allylic carbonate) monomer of 4,4'-[phenylenebis(alkylidene)]bis[phenol], or similar names, are intended to mean and include the named principal monomeric compound and all related species which may be contained therein.

The partially polymerized monomer composition is prepared by partially polymerizing the bis(allylic carbonate) monomer of 4,4'-(alkylidene)bis[phenol] and/or the bis(allylic carbonate) monomer of 4,4'-[phenylenebis(alkylidene)]bis[phenol] to utilize more than half of the allylic groups without incurring significant gellation. By terms such as "significantly gel-free" and "without incurring significant gellation" is meant that the composition contains less than about 5 percent by weight, basis the original bis(allylic carbonate) monomer, of gel. In many cases the composition contains less than about 2 percent gel by weight, basis the original bis(allylic carbonate) monomer. Preferably no gel is present in the composition.

The polymerizable, liquid, substantially gel-free, partially polymerized monomer compositions of the invention may be conveniently prepared by solution polymerization. The bis(allylic carbonate) monomer is dissolved in solvent in which the partially polymerized monomer is also soluble. Initiator, which is preferably also soluble in the solvent, is included in the reaction mixture. The resulting liquid solution comprising bis(allylic carbonate) monomer, solvent, and preferably initiator is then partially polymerized by heating the reaction mixture to polymerization temperatures. The polymerization is allowed to continue until more than 50 percent allylic utilization is attained, that is, until more than 50 percent of the ethylenic unsaturation initially provided by the monomer have been consumed. The degree of allylic utilization can be controlled by regulating the amount of initiator present in the liquid solution, the temperature at which the partial polymerization is performed, and the ratio of solvent to bis(allylic carbonate) monomer. Generally, the greater the amount of initiator used, the higher is the allylic utilization. The higher the temperature of polymerization, the lower is the degree of allylic utilization. At constant temperature and employing a given amount of initiator, the higher the ratio of solvent to monomer, the lower is the degree of allylic utilization. Ordinarily however, if at constant temperature the ratio of solvent to monomer is increased and the amount of initiator employed is also sufficiently increased, the reaction can be driven to a higher degree of allylic utilization without the formation of gel than in a system containing less solvent.

Upon reaching the desired degree of allylic utilization, polymerization is terminated. This may be accomplished by reducing the temperature of the reaction mixture to values where the polymerization reaction for all practical purposes ceases, by the addition of an inhibitor which destroys the free radicals necessary for further polymerization, or both.

After the polymerization reaction has been terminated, the solvent is preferably removed. This can be accomplished by known techniques, as for example, by evaporation, stripping, or distillation, leaving a solution of poly(allylic carbonate)-functional polymer in bis-(allylic carbonate) monomer. This solution is essentially free of the solvent used during the polymerization process. The essentially solvent-free solution is typically a syrupy liquid having a kinematic viscosity at 25° C. in the range of from about 100 to about 100,000 centistokes. In many cases the kinematic viscosity is in the range of from about 1000 to about 90,000 centistokes at 25° C. Frequently the kinematic viscosity at 25° C. is in the range of from about 5000 to about 80,000 centistokes. The density of the essentially solvent-free solution is ordinarily in the range of from about 1.17 to about 1.23 grams per cubic centimeter at 25° C. The essentially solvent-free solution is further characterized by having an allylic utilization of more than 50 percent as determined by infrared spectroscopy or nuclear magnetic resonance spectroscopy.

Organic solvents useful in carrying out the solution polymerization are those which are non-reactive chemically with the monomer and resulting polymer, have a boiling temperature substantially below the monomer, i.e., a higher vapor pressure, so as to be easily separated from the monomer by distillation, and which serve as a solvent for the bis-(allylic carbonate monomer (and preferably also for the initiator)) and the resulting liquid aromatic-containing poly(allyl carbonate)-functional polymer. Useful solvents include the halogenated, e.g., chlorinated, $C_1$-$C_2$ hydrocarbon solvents, i.e., methyl chloride, methylene chloride, ethyl chloride, ethylene dichloride, 1,1,2-trichloro-1,2,2,-trifluoroethane, and mixtures thereof. Methylene chloride is preferred because of its high vapor pressure, low boiling point, ease of separation, and relatively low toxicity.

The amount of solvent used in the partial polymerization process should be sufficient to solubilize all of the monomer and to maintain all of the resulting polymer in solution. This is generally from about 0.5 to 5 milliliters of solvent per gram of monomer. Greater amounts of solvent can be used without deleterious effect. Lesser amounts of solvent often result in the formation of an insoluble, infusible, intractable gel when allylic utilization above 50 percent are employed.

The concentration of initiator useful for the partial polymerization should be sufficient to result in the desired degree of allylic utilization at the conditions used, and generally can vary from 0.1 to about 3 weight percent initiator, basis weight of monomer. Greater amounts of initiator may result in either residual initiator in the product or formation of an infusible, insoluble, intractable gel. The initiators useful in carrying out the solution polymerization of the bis(allylic carbonate) monomer are free radical initiators, e.g., organic peroxides and azo catalysts, and are well known in the art. The preferred free radical initiators are organic peroxy compounds, such as Peroxyesters, diacyl peroxides peroxydicarbonates and mixtures of such peroxy compounds.

Examples of peroxy compounds include: peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxydicarbonate, dicyclohexyl peroxydicarbonate, di(4-tert-butylcyclohexyl) peroxydicarbonate, and isopropyl sec-butyl peroxydicarbonate; diacetyl peroxides such as diacetyl peroxide, dibenzoyl peroxide, dilauroyl peroxide, and diisobutyryl peroxide; and peroxyesters such as tertiary-butyl perpivalate, tertiary-butyl peroctoate and tertiary-butyl perneodecanoate.

Only one peroxy compound or a mixture of peroxy compounds may be used as desired.

The solution polymerization is generally carried out at temperatures of from about 28° C. to about 100° C., for from about 1 to about 24 hours. The time and temperature depend on the initiator and the concentration thereof, and the solvent:monomer ratio used. In most cases the polymerizable composition is pourable. Such pourable, polymerizable compositions are especially useful for casting lenses, lens blanks, and other shapes by pouring the composition into suitable molds and then polymerizing the composition to form a solid, thermoset polymer of the desired shape.

Although the partially polymerized monomer composition may itself be polymerized to form hard polymerizates, more frequently the composition is formulated with one or more other materials prior to such polymerization.

Accordingly, another embodiment of the invention is a polymerizable, liquid formulation comprising (a) polymerizable, liquid, substantially gel-free, partially polymerized monomer composition wherein (i) the monomer which has been partially polymerized is bis(allylic carbonate) monomer of at least one 4,4'-(alkylidene)-bis[phenol], bis(allylic carbonate) monomer of at least one 4,4'-[phenylenebis(alkylidene)]bis-[phenol], or a mixture thereof, and (ii) the allylic utilization of the composition is greater than 50 percent; and (b) one or more other materials.

It is preferred that the formulation be essentially free of the solvent used in the polymerization process in which the partially polymerized monomer composition was formed.

When, as is preferred, polymerization of the polymerizable composition is initiated by thermally generated free radicals, the polymerizable formulation contains initiator. The thermal initiators which may be used in the present invention may be widely varied, but in general they are thermally decomposable to produce radical pairs. One or both members of the radical pair are available to initiate additional Polymerization of ethylenically unsaturated groups in the well-known manner.

The preferred thermal initiators are peroxy initiators. There are many different peroxy initiators which can be used. Examples of such peroxy initiators include: peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxydicarbonate, dicyclohexyl peroxydicarbonate, di(4-tert-butylcyclohexyl) peroxydicarbonate, and isopropyl sec-butyl peroxydicarbonate; monoperoxycarbonates such as tertiary-butylperoxy isopropyl carbonate and tertiary-amylperoxy isopropyl carbonate; diacetyl peroxides such as diacetyl peroxide, dibenzoyl peroxide, dilauroyl peroxide, and diisobutyryl peroxide; and peroxyesters such as tertiary-butyl perpivalate, tertiary-butyl peroctoate and tertiary-butyl perneodecanoate.

Only one initiator or a plurality of initiators may be used as desired.

When used, the amount of initiator present in the polymerizable formulation may be widely varied. Ordinarily the weight ratio of the initiator to all ethylenically unsaturated material present in the formulation is in the range of from about 0.5:100 to about 7:100. In many cases the weight ratio is in the range of from about 1:100 to about 5:100. A weight ratio in the range of from about 1.5:100 to about 2.5:100 is preferred.

It will be recognized by those skilled in the art that the most preferred weight ratios of initiator will depend upon the nature of the initiator used (its active oxygen content) as well as the nature and ratios of the variously ethylenically unsaturated materials present in the formulation.

Other ethylenically unsaturated compounds, as for example, acrylates, methacrylates, ethacrylates, haloacrylates, vinyl-functional compounds, other allylic-functional compounds, other alkyl or halo substituted allylic-functional compounds, and/or esters of ethylenically unsaturated dicarboxylic acids may be present in the polymerizable formulation. When the other ethylenically unsaturated compounds are present, they usually constitute from about 1 to about 50 percent by weight of the polymerizable formulation. In many cases they constitute from about 2 to about 25 percent by weight of the polymerizable formulation. From about 5 to about 20 percent is preferred.

Other materials which may be present in the polymerizable formulation include mold release agents and dyes.

The listing of other materials discussed above is by no means exhaustive. These and other ingredients may be employed in their customary amounts for their customary purposes so long as they do not preclude the formation of solid, crosslinked polymer.

In most cases the polymerizable formulation comprises from about 50 to about 99.5 percent by weight of the partially polymerized monomer composition. Often the polymerizable formulation comprises from about 70 to about 98 percent by weight of the partially polymerized monomer composition. From about 80 to about 95 percent by weight is preferred. It is also preferred that the partially polymerized monomer composition employed in the polymerizable formulation be essentially free of the solvent in which the monomer composition was formed.

In the polymerizable formulation, the ethylenically unsaturated materials should be in the form of a solution in the proportions used. Insoluble materials, such as for example pigments, while not preferred, may also be present.

The polymerizable formulations of the invention are usually prepared by admixing the various ingredients. Mixing may be accompanied with heating when it is desirable to hasten dissolution of any of the ingredients. However, if initiator is present during heating, the temperature should ordinarily be maintained below that at which polymerization is initiated. It is preferred to employ heating in the absence of initiator, to cool the resulting solution, and then to introduce the initiator and other ingredients which enter the solution without undue difficulty.

The formulations of the invention can be free-radically polymerized by known conventional techniques for polymerizing (allylic carbon- ate)-containing formulations to form solid, crosslinked polymer.

Preferably, polymerization is accomplished by heating the polymerizable formulation containing free-radical initiator to elevated temperatures. Typically polymerization is conducted at temperatures in the range of from about 28° C. to about 100° C. In many cases post curing, that is, heating beyond the time thought necessary to substantially fully polymerize the formulation is employed. The post cure is often carried out above about 100° C., but below the temperatures at which thermal degradation provides undesirable yellowness, e.g., about 125° C., and preferably for a time sufficient to attain either substantially constant or maximum Barcol hardness. For example, when the cure cycle shown in Table 2 below is followed, the polymerizate may be maintained at 100° for an additional 1 to 4 hours or more. Although not wishing to be bound by any theory, the additional 1 to 4 hours of post cure is believed to decomPose, primarily by initiation and chain termination, from 83 percent to 99.9 percent of the peroxide initiator remaining unreacted at the end of the normal 18 hour cure cycle. Moreover, the additional 1 to 4 hours of cure often increases the Barcol Hardness by about 5 to 8 units.

In most cases, the polymerizate is conformed to the shape of the final solid polymerized article below polymerization. For example, the formulation can be poured onto a flat surface and heated, whereby to effect polymerization and form a flat sheet or coating. According to a still further exemplification, the polymerizable formulation is placed in molds, as for instance glass molds, and the molds heated to effect polymerization, thereby forming shaped articles such as lens blanks or lenses. In one particularly preferred embodiment, the formulation is poured into a lens mold and polymerized therein to produce an ophthalmic lens. In another particularly preferred embodiment, the formulation is poured into a lens blank mold and polymerized therein to produce a lens blank.

A wide variety of cure cycles, that is, time-temperature sequences, may be used during polymerization.

Ordinarily the cure cycle employed is based upon a consideration of several factors including the size of the casting, the identity of the initiator, and the reactivity of the ethylenically unsaturated material. For casting ophthalmic lenses or lens blanks, several standard cure cycles have been developed and these are shown in Tables 1 ∝ 4. These standard cure cycles are useful in forming polymerizates according to the present invention, but they are, however, only exemplary, and others may be used.

TABLE 1

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of Cycle) |

TABLE 2

Standard Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 (End of Cycle) |

TABLE 3

Standard Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 (End of Cycle) |

TABLE 4

Standard Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 (End of Cycle) |

Usually thermoset polymers have 15-second Barcol hardnesses of at least zero. In many cases the Barcol hardness is at least about 15, and preferably it is at least about 25. As used herein, 15-second Barcol hardness is determined in accordance with ASTM Test Method D 2583-81 using a Barcol Impressor and taking scale readings 15 seconds after the impressor point has penetrated the specimen.

The invention is further described in conjunction with the following examples which are to be considered illustrative rather than limiting, and in which all parts are parts by weight and all percentages are percentages by weight unless otherwise specified.

EXAMPLE I

A solution was formed by admixing 150 grams of the bis(allyl carbonate) monomer of 4,4'-(1-methylethylidene)bis[phenol], 450 milliliters of methylene chloride, and 3 grams of diisopropyl peroxydicarbonate. The solution was poured into a glass bottle. The bottle was purged with argon for 3 minutes, sealed, and placed in a 70° C. water bath where it remained for 18 hours. The bottle was then removed from the water bath and opened. An inhibited solution was formed by admixing 0.0015 gram of hydroquinone monomethyl ether dissolved in methylene chloride with the material in the bottle. The methylene chloride solvent was removed under vacuum in a rotary evaporator from two portions of the inhibited solution to produce two product samples of polymerizable, liquid, partially polymerized monomer composition which were gel-free and essentially free of methylene chloride. Infrared spectrographic analysis of the original bis(allyl carbonate) monomer and the two product samples showed the allylic utilizations of the two product samples to be 65.52 percent and 64.12 percent, respectively.

EXAMPLE II

A solution was formed by admixing 50 grams of the bis(allyl carbonate) monomer of 4,4'-[1,3-phenylenebis(1-methylethylidene)]bis-[phenol], 150 milliliters of methylene chloride, and 0.75 grams of diisopropyl peroxydicarbonate. The solution was poured into a glass bottle. The bottle was purged with argon for 3 minutes, sealed, and placed in a 70° C. water bath where it remained for 18 hours. The bottle was then removed from the water bath and opened. An inhibited solution was formed by admixing 0.0005 gram of hydroquinone monomethyl ether dissolved in methylene chloride with the material in the bottle. The methylene chloride solvent was removed under vacuum in a rotary evaporator from two portions of the inhibited solution to produce two product samples of polymerizable, liquid, partially polymerized monomer composition which were gel-free and essentially free of methylene chloride. Infrared spectrographic analysis of the original bis(allyl carbonate) monomer and the two product samples showed the allylic utilizations of the two product samples to be 57.54 percent and 59.23 percent, respectively.

EXAMPLE III

A solution was formed by admixing 50 grams of the bis(allyl carbonate) monomer of 4,4'-[1,3-phenylenebis(1-methylethylidene)]bis-[phenol], 150 milliliters of methylene chloride, and 1.25 grams of diisopropyl peroxydicarbonate. The solution was poured into a glass bottle. The bottle was purged with argon for 3 minutes, sealed, and placed in a 70° C. water bath where it remained overnight. The bottle was then removed from the water bath and opened. An inhibited solution was formed by admixing 0.0005 gram of hydroquinone monomethyl ether with the material in the bottle. The methylene chloride solvent was removed under vacuum in a rotary evaporator from two portions of the inhibited solution to produce two product samples of polymerizable, liquid, partially polymerized monomer composition which were gel-free and essentially free of methylene chloride. Infrared spectrographic analysis of the original bis(allyl carbonate) monomer and the two product samples showed the allylic utilizations of the two product samples to be 79.36 percent and 78.64 percent, respectively.

Although the present invention has been described with reference to specific details of certain embodiments thereof, it is not intended that such details should be regarded as limitations upon the scope of the invention except insofar as they are included in the accompanying claims.

We claim:

1. A polymerizable, liquid, substantially gel-free, partially polymerized monomer composition wherein
   (a) the monomer which has been partially polymerized is bis(allylic carbonate) monomer of at least one 4,4'-(alkylidene)bis[phenol], bis(allylic carbonate) monomer of at least one 4,4'-[phenylenebis(alkylidene)]-bis[phenol], or a mixture thereof, and
   (b) the allylic utilization of said composition is greater than 50 percent.

2. The composition of Claim 1 wherein the allylic utilization is at least 51 percent.

3. The composition of Claim 1 wherein the allylic utilization is at least about 55 percent.

4. The composition of Claim 1 wherein the allylic utilization is at least about 60 percent.

5. The composition of Claim 1 wherein the allylic utilization is in the range of from 51 to about 80 percent.

6. The composition of Claim 1 wherein the allylic utilization is in the range of from about 55 to about 80 percent.

7. The composition of claim 1 wherein the allylic utilization is in the range of from about 60 to about 80 percent.

8. The composition of claim 1 wherein the monomer which has been partially polymerized is bis(allylic carbonate) monomer of one or more bisphenolic compounds, each represented by the formula

HO—A—OH where A is represented by the formula

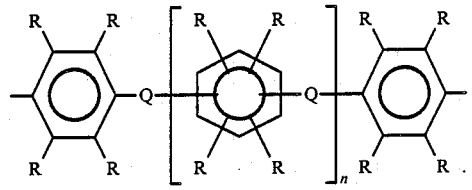

in which each Q is alkylidene independently containing from 1 to about 5 carbon atoms, each R is independently hydrogen, halo, lower alkyl containing from 1 to about 4 carbon atoms, methoxy, or ethoxy, and the value of $n$ is 0 or 1.

9. The composition of claim 8 wherein each Q is 1-methylethylidene.

10. The composition of claim 8 wherein said bis(allylic carbonate) monomer is bis(allyl carbonate) monomer.

11. The composition of claim 1 which is essentially solvent-free.

12. The composition of Claim 11 wherein the monomer which has been partially polymerized is bis(allyl carbonate) monomer of at least one bisphenolic compound selected from 4,4'-(1-methylethylidene)bis[phenol], 4,4'-(1-methylethylidene)bis[2,6-dichlorophenol], 4,4'-(1-methylethylidene)bis[2,6-dibromophenol], and 4,4'-[1,3-phenylenebis(1methylethylidene)]bis[phenol].

13. The composition of Claim 11 wherein the monomer which has been partially polymerized is bis(allyl carbonate) monomer of 4,4'-(1methylethylidene)bis[phenol].

14. The composition of Claim 11 wherein the monomer which has been partially polymerized is bis(allyl carbonate) monomer of 4,4'-[1,3phenylenebis(1-methylethylidene)]bis[phenol].

* * * * *